| 
US011667812B2

(12) United States Patent
Masia et al.

(10) Patent No.: US 11,667,812 B2
(45) Date of Patent: Jun. 6, 2023

(54) SOIL AND DIRT REPELLENT POWDER COATINGS

(71) Applicant: ARMSTRONG WORLD INDUSTRIES, INC., Lancaster, PA (US)

(72) Inventors: Steven L. Masia, Lancaster, PA (US); Michelle X. Wang, Lititz, PA (US); Kenneth G. Caldwell, Mountville, PA (US)

(73) Assignee: AWI Licensing LLC, Wilmington, DE (US)

( * ) Notice: Subject to any disclaimer, the term of this patent is extended or adjusted under 35 U.S.C. 154(b) by 453 days.

(21) Appl. No.: 16/879,102

(22) Filed: May 20, 2020

(65) Prior Publication Data
US 2020/0277511 A1 Sep. 3, 2020

Related U.S. Application Data

(62) Division of application No. 15/924,848, filed on Mar. 19, 2018, now Pat. No. 10,696,864, which is a division of application No. 14/746,313, filed on Jun. 22, 2015, now Pat. No. 9,920,219.

(51) Int. Cl.
| | |
|---|---|
| *C09D 175/06* | (2006.01) |
| *C09D 175/04* | (2006.01) |
| *C09D 5/03* | (2006.01) |
| *C09D 5/16* | (2006.01) |
| *C08G 18/80* | (2006.01) |
| *B05D 1/12* | (2006.01) |
| *B05D 3/02* | (2006.01) |
| *C08K 5/521* | (2006.01) |
| *C09D 167/00* | (2006.01) |
| *C09D 133/06* | (2006.01) |
| *C09D 133/14* | (2006.01) |
| *C08K 5/02* | (2006.01) |
| *C08K 5/00* | (2006.01) |
| *C08G 18/42* | (2006.01) |
| *C08K 9/04* | (2006.01) |
| *C08K 5/49* | (2006.01) |

(52) U.S. Cl.
CPC ............ *C09D 175/06* (2013.01); *B05D 1/12* (2013.01); *B05D 3/0254* (2013.01); *C08G 18/80* (2013.01); *C08K 5/521* (2013.01); *C09D 5/033* (2013.01); *C09D 5/1681* (2013.01); *C09D 167/00* (2013.01); *C09D 175/04* (2013.01); *B05D 2506/10* (2013.01); *C08G 18/42* (2013.01); *C08G 2150/20* (2013.01); *C08K 5/0041* (2013.01); *C08K 5/02* (2013.01); *C08K 5/49* (2013.01); *C08K 9/04* (2013.01); *C09D 133/064* (2013.01); *C09D 133/068* (2013.01); *C09D 133/14* (2013.01)

(58) Field of Classification Search
CPC .... C09D 175/06; C09D 175/04; C09D 5/033; C09D 5/1681; C09D 167/00; C09D 133/068; C09D 133/14; C09D 133/064; C08G 18/80; C08G 18/42; C08G 2150/20; B05D 1/12; B05D 3/0254; B05D 2506/10; C08K 5/521; C08K 5/02; C08K 5/0041; C08K 5/49; C08K 9/04
USPC ........................................................ 427/195
See application file for complete search history.

(56) References Cited

U.S. PATENT DOCUMENTS

| | | | |
|---|---|---|---|
| 3,083,224 A | 3/1963 | Brace et al. | |
| 4,144,185 A | 3/1979 | Block | |
| 4,246,380 A | 1/1981 | Gras et al. | |
| 5,879,623 A | 3/1999 | Glover et al. | |
| 5,908,822 A | 6/1999 | Dishart | |
| 6,398,862 B1 * | 6/2002 | Hechler | C09C 1/0021 106/404 |
| 6,812,267 B2 * | 11/2004 | Lin | C08J 3/005 525/934 |
| 2002/0001677 A1 * | 1/2002 | Dumain | C09D 133/068 525/124 |
| 2003/0060558 A1 * | 3/2003 | Lin | C09D 127/16 523/352 |
| 2004/0024804 A1 | 12/2004 | Medsker et al. | |
| 2005/0080171 A1 | 4/2005 | Reisacher et al. | |
| 2008/0182928 A1 | 7/2008 | Grahl et al. | |
| 2011/0091408 A1 * | 4/2011 | Raghavanpillai | C09D 7/47 510/513 |
| 2013/0090417 A1 | 4/2013 | Lin et al. | |
| 2016/0160054 A1 * | 6/2016 | Saito | C09D 163/00 524/81 |

FOREIGN PATENT DOCUMENTS

| | | |
|---|---|---|
| CN | 1464886 A | 12/2003 |
| CN | 101148561 A | 3/2008 |
| CN | 102361880 A | 2/2012 |
| CN | 103649288 A | 3/2014 |
| EP | 2767565 A1 | 8/2014 |
| JP | H04-018455 U | 2/1992 |
| JP | 2004-535485 A | 11/2004 |

(Continued)

OTHER PUBLICATIONS

English translation of Japanese Office Action for related application No. 2017-566291 dated Jun. 23, 2020.

*Primary Examiner* — Michael M. Bernshteyn
(74) *Attorney, Agent, or Firm* — Patrick Sheldrake

(57) ABSTRACT

A method of forming a dirt repellant panel coated with a powder coating composition that includes a polymeric binder and an anionic fluorosurfactant present in an amount ranging from about 0.1 wt. % to about 4 wt. %.

20 Claims, No Drawings

(56) References Cited

FOREIGN PATENT DOCUMENTS

| JP | 2013-081941 A | 5/2013 |
|----|---------------|--------|
| WO | WO 2010/080202 A1 | 7/2010 |
| WO | WO 2012/045078 A1 | 10/2012 |
| WO | WO 2012/145078 A1 | 10/2012 |
| WO | WO 2013/001705 A1 | 8/2013 |
| WO | WO 2015/046262 A1 | 3/2017 |

* cited by examiner

SOIL AND DIRT REPELLENT POWDER COATINGS

CROSS-REFERENCE TO RELATED APPLICATIONS

This application is a divisional of U.S. patent application Ser. No. 15/924,848 filed on Mar. 19, 2018, which is a divisional of U.S. patent application Ser. No. 14/746,313 filed on Jun. 22, 2015. The disclosure of the above application is incorporated herein by reference.

FIELD OF INVENTION

The present invention is directed to soil and dirt repellent powder coatings comprising anionic fluorosurfactants

BACKGROUND

It is known that certain fluoro-carbon containing polymers and siloxane containing polymers may be able to add dirt-resistant properties to paints and other solvent-based coatings. However, previously, large quantities of such fluoro-carbon and siloxane containing polymers were required by the overall formulation—in order to obtain the desired dirt-resistant properties in the resulting coating. As such, the resulting balance between the dirt-resistant properties of the exposed surface of the coating and the coatings ability to adhere to the underlying substrate was undermined. Thus there exists a need to provide dirt-resistant coatings—specifically soil and dirt repellent coatings—that achieve the desired exposed surface repellency, while not undermining the bond strength to the underlying substrate. A powder coating system can benefit from such dirt-resistant properties, but unlike typical paints and coatings, it has additional constraints that it is desirable to be a solvent free system.

SUMMARY

Some embodiments of the present invention include a dirt repellant panel comprising a substrate and a powder coating applied to the substrate. In some embodiments, the powder coating is formed from a mixture comprising a blend of polymer resin, cross-linker, and a surfactant composition. In some embodiment, the polymer resin is substantially free of fluoro-carbon groups. The surfactant composition may be solvent-free and comprise an anionic fluorosurfactant. According to some embodiments, the anionic fluorosurfactant may be present in an amount ranging from 0.05 wt. % to 4 wt. % based on the total weight of the powder coating composition.

Some embodiments of the present invention include a powder coating composition comprising a blend of a binder comprising a polymer resin that is substantially free of fluoro-carbon groups; and a pigment that is pre-treated with an anionic fluorosurfactant; wherein the blend is substantially free of solvent.

According to some embodiments, the present invention is directed to a dirt repellant panel comprising a substrate and a powder coating applied to the substrate. The powder coating may be formed from a mixture that is substantially free of solvent. In some embodiments, the mixture comprises a binder and a pigment. In some embodiments, the mixture comprises a polymer resin that is substantially free of fluoro-carbon groups. In some embodiments, the pigment is pre-treated with an anionic fluorosurfactant.

In some embodiments, the present invention is directed to a method of forming a dirt repellant panel. The method may include a first step of preparing a powder coating comprising a polymer binder, a pigment, and an anionic fluorosurfactant. The method may further include a second step of applying the powder coating to a substrate. The method may further include a third step of curing the powder coating to form the dirt repellant panel. In some embodiments, the dirt repellant coated substrate is a ceiling tile or panel. According to some embodiments of the present invention, the polymer binder is substantially free of fluoro-carbon groups and the anionic fluorosurfactant is present in an amount ranging from 10 wt. % to 25 wt. % based on the total weight of a single pigment.

DETAILED DESCRIPTION

The present invention is directed to soil and dirt repellant panels comprising a substrate and a powder coating layer that is applied to the substrate. The powder coating exhibits soil and dirt repellant characteristic based on the inclusion of anionic fluoro-compounds. The powder coating is formed from a high-solids precursor mixture of a binder composition and cross-linker. The precursor mixture may be reacted at an elevated temperature to form the fully cured powder coating composition, as discussed herein. In some embodiments, the precursor mixture has a solids content of 100% and is substantially free of solvent.

The binder composition may include a polymeric resin that can react with the cross-linker during curing, as discussed herein, thereby forming the fully cured matrix composition. According to some embodiments, the polymeric resin of the present invention to have specific material properties, including glass transition temperature, molecular weight, functionality, melt viscosity, and film formation and leveling properties. Without proper consideration to the above references material properties, selecting the undesirable polymeric resin may result in a composition that is unsuitable for powder coatings as the resulting precursor mixture may exhibit poor shelf-life and inadequate flow properties during processing, and the resulting powder coating may exhibit inadequate film formation characteristics rendering the coating inoperable.

According to the present invention, the polymeric resin should comprise at least one polymeric composition having a glass transition temperature (Tg) that is greater than room temperature, preferably at least about 50° C. According to some embodiments of the present invention, the polymeric resin may have a Tg that is about 50° C. According to some embodiments of the present invention, the polymeric resin may have a Tg that is about 60° C. According to some embodiments of the present invention, the polymeric resin may have a Tg that is about 70° C. For the purposes of the present invention, the term "about" means+/−5%.

Selecting the correct glass transition temperature of the polymeric resin is an important consideration for powder coating applications as a Tg that is too low may result in a precursor mixture that cannot resist sintering and agglomeration during storage and/or shipping of the mixture, thereby degrading the shelf-life of the precursor mixture. Conversely, since powder coatings have high solids contents, selecting a polymeric resin that has a Tg that is too high may result in a precursor mixture that does not exhibit adequate flow during processing or leveling properties after application, thereby resulting in an un-evenly applied powder coating composition. The Tg of a polymeric resin can be controlled through the selection of a number of parameters including, but not limited to, molecular weight, type of polymeric backbone, and the degree of crystallinity, as discussed herein.

The flow properties of the polymeric resin are measured by a melt viscosity. At high solids content (preferably 100% solids, free of solvent), the obtaining a low melt viscosity is a consideration to ensure maximum flow of the polymeric resin during processing. As a polymeric resin is processed during mixing and curing (as discussed herein), the polymeric resin begins to react with a curing agent, also referred to as a cross-linker, that is present in the precursor mixture thereby creating a significant increase in viscosity of the precursor mixture as it becomes the fully cured powder coating. Therefore, using a polymeric resin that exhibits a low melt viscosity is a criteria to ensure that there is ample time for the precursor mixture to mix and flow through the processing unit (as discussed herein) before the precursor mixture has reacted a degree of cross-linking that approaches the fully cured powder coating. The melt viscosity of a polymeric resin is the result of a number of factors that include: molecular weight, functionality, and type of polymeric backbone, as discussed herein. The specific melt viscosities of the polymeric resin and overall precursor mixture will be discussed herein.

According to the present invention, the polymeric resin should comprise at least one polymeric composition having a weight average (Mw) molecular weight that ranges from about 1,500 to 15,000. In some embodiments of the present invention, the polymeric resin may have a weight average (Mw) that ranges from about 15,000 to 30,000. The molecular weight of the polymeric resin impacts the flexibility, impact strength, and processesability of the powder coating (i.e. melt viscosity). Polymeric resins having a greater molecular weight (Mw) exhibit greater melt viscosities as compared to lower weight (Mw) polymeric resins In a preferred embodiment, the polymeric resin having a molecular weight (Mw) ranging from about 1,500 to about 15,000 has a polydispersity of about 1. Polydispersity is a ratio of weight average (Mw) molecular weight to number average (Mn) molecular weight of a polymeric composition. Having a polydispersity of about 1 ensures that the physical properties of the resulting powder coating (i.e., flexibility, impact strength) are maximized without sacrificing a desired low melt viscosity of the precursor mixture during processing. The low melt viscosity being suitable when processing at a high solids content (preferably solve-free) precursor mixture, as may be required for the powder coating according to some embodiments of the present invention.

According to some embodiments, forming a three-dimensional, cross-linked polymeric network that forms the powder coating of the present invention requires that the polymeric resin comprises a polymer having an average of at least two functional groups that are available to react with functional groups present on the cross-linker. In some embodiments, the polymeric resin may have an average number of functional groups, the average ranging from 2 to 10 functional groups. In some embodiments, the polymeric resin may have a backbone that is linear or branched and the placement of the functional groups will depend on the type of backbone of the polymeric resins. In some embodiments, the polymeric resin is a linear polymer having two to four functional groups positioned at the terminal ends of the polymer. The functional groups of the polymeric resin may be selected from hydroxyl groups, carboxylic acid groups, isocyanate groups, epoxy groups, acrylic groups and a combination thereof. In some embodiments, the functional groups of the polymeric binder may be temporarily blocked as discussed herein.

According to some embodiments of the present invention, the polymeric resin may comprise polymer having a backbone with moieties selected from ester groups, urethane groups, carbonate groups, epoxy groups and a combination thereof.

In some embodiments, the binder composition includes a polymeric resin selected from polyester resin, polyurethane resin, epoxy resin, and polyester-urethane acrylate resin. Suitable polyester resins may be hydroxyl-functional (OH) or carboxyl-functional (COOH). The polyester resin may be the reaction product of a polycarboxylic acid and a polyol. For the purposes of this invention, the term polycarboxylic acid includes compounds having at least two carboxylic acid groups. For the purposes of this invention, the term polyol includes compounds having at least two hydroxyl groups. For hydroxyl-functional polyester, the polyol is present relative to the polycarboxylic acid in an OH:COOH stoichiometric excess that ranges from 2:1 to 6:1. Excess polyol ensures that all free carboxylic acid groups are consumed while allowing excess hydroxyl groups to remain unconsumed during the esterification reaction. The hydroxyl groups may be present at the terminal ends of the polyester. For carboxyl-functional polyester, the polycarboxylic acid is present relative to the polyol in a COOH:OH stoichiometric excess that ranges from 2:1 to 6:1. Excess polycarboxylic acid ensures that all free hydroxyl groups are consumed while allowing excess carboxylic acid groups to remain unconsumed during the esterification reaction. The carboxylic acid groups may be present at the terminal ends of the polyester.

The condensation reaction of hydroxyl-functional and carboxyl-functional compounds to form the polyester resin may be aided by a catalyst. In some non-limiting embodiments, the catalyst may be selected from N-methylimidazole, diazabicyclo[2,2,2]octane, diazabicyclo[5,4,0]undec-7-ene and pentamethyldiethylenetriamine and mixtures thereof. Other examples of suitable esterification catalyst include tetrabutyl-o-titanate, stannous octoate, p-toluene sulphonic acid, and combinations thereof.

In non-limiting embodiments, the polyol may be a diol, a triol, or a higher-functional polyol having 4-8 hydroxyl groups (e.g. tetrol). In some embodiments the polyol may be aromatic, cycloaliphatic, aliphatic, or a combination thereof. In some embodiments the carboxyl-functional compound is dicarboxylic acid, a tricarboxylic acid, a higher functional polycarboxylic acid having 4-8 carboxylic acid groups, or a combination thereof. In some embodiments, the polycarboxylic acid may be aliphatic, cycloaliphatic, aromatic, or a combination thereof.

In some embodiments the polyol may include a diol that is selected from alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; cyclohexanedimethanol; hexanediols including 1,6-hexanediol; hydroxy-alkylated bisphenols; polyether glycols, for example, poly(oxytetramethylene) glycol. In some embodiments, the polyol may be a triol or higher polyol that is selected from trimethylol propane, pentaerythritol, di-pentaerythritol, trimethylol ethane, trimethylol butane, dimethylol cyclohexane, glycerol and the like.

In some embodiments the polycarboxylic acid may include a dicarboxylic acid that is selected from adipic acid, azelaic acid, sebacic acid, succinic acid, glutaric acid, decanoic diacid, dodecanoic diacid, phthalic acid, isophthalic acid, 5-tert-butylisophthalic acid, tetrahydrophthalic acid, terephthalic acid, hexahydrophthalic acid, methylhexahydrophthalic acid, dimethyl terephthalate, 2,5-furandicarboxylic acid, 2,3-furandicarboxylic acid, 2,4-furandicarboxylic acid, 3,4-furandicarboxylic acid, 2,3,5-furantricarboxylic acid, 2,3,4,5-furantetracarboxylic acid, cyclohexane dicarboxylic acid, 1,3-cyclohexane dicarboxylic acid, 1,4-cyclohexane dicarboxylic acid, and anhydrides thereof, as well as mixtures thereof. In some embodiments the polycarboxylic acid may be selected from tricarboxylic acids such as trimellitic acid and anhydrides thereof.

In some embodiments, suitable polyurethane resins for the powder coating composition are disclosed, for example, in U.S. Pat. Nos. 4,404,320, and 4,246,380. Suitable polyester-urethane acrylates are disclosed, for example, in U.S. Pat. No. 6,284,321. Suitable epoxy compounds for the powder coating composition are disclosed, for example, in U.S. Pat. No. 5,732,052.

The specific type and amount of reactant used to create the polyester resin has a significant effect on the melt viscosity, crystallinity, and Tg of the polymeric resin. Specifically, aromatic and/or cycloaliphatic monomers lead to high Tg polymers, and longer-chain aliphatic monomers lead to lower Tg polymers. For example, a polyester resin having a significant level of ester groups in the backbone that are derived from terephthalic acid/isophthalic acid can have its Tg lowered by replacing certain amounts of the terephthalic acid/isophthalic acid with adipic acid, thereby making the polyester resins more flexible and more likely to flow at a lower temperature. However, substituting too much adipic acid will result in the polyester having a Tg that is too low to be used in powder coating formulations.

In a non-limiting embodiment, the polymeric resin has a 100% solids content (i.e. is free of solvent) and has a melt viscosity ranging from 2,000 mPa/s to 5,000 mPa/s at 200° C.—including all sub-ranges and integers there between. In the non-limiting embodiment, the polymeric resin may have a Tg ranging from about 50° C. to about 70° C. In some embodiments, the polymeric resin may be hydroxyl-functional and have a hydroxyl value ranging from about 40 to about 300. Non-limiting examples of suitable hydroxyl-functional polymeric resin include hydroxyl-functional polyester resin, such as commercially available Polymac 3110 and/or Rucote 102. In some embodiments, the polymeric resin may be carboxyl-functional and have an acid number ranging from 30 to 50.

According to some embodiments of the present invention, the cross-linker comprises at least one low molecular weight compound having at least two functional groups. The cross-linker may comprise between 2 and 6 functional groups. In an alternative embodiment, the cross-linker may comprise between 2 and 4 functional groups. The functional groups of the cross-linker may be selected from hydroxyl groups, carboxylic acid groups, isocyanate groups, epoxy groups, and a combination thereof.

In some non-limiting embodiments, suitable cross-linkers may include the aforementioned polyol compounds, polycarboxylic acid compounds, as well as polyisocyanate compounds and epoxy-functional compounds, such as glycidyl-functional acrylic copolymers. In some embodiments, the functional groups of the cross-linker may be temporarily blocked, as discussed herein, thereby enhancing the shelf-life of the precursor mixture during storage and shipment. The specific functional group will depend on the desired composition of the resulting powder coating.

The specific selection of cross-linker will depend on the type of polymeric resin and the desired final matrix composition. For example, hydroxyl functional polyester may be cured with polycarboxylic acid cross-linker, thereby resulting in a three-dimensional polyester matrix—with the OH:COOH stoichiometric ratio of polyester resin to cross-linker being about 1:1 to ensure all functional groups on both the polymeric resin and cross-linker are consumed during the esterification cross-linking reaction.

The hydroxyl functional polyester may alternatively be cured with polyisocyanate cross-linker, thereby resulting in a polyester-polyurethane matrix. The OH:NCO ratio of polyester resin to polyisocyanate cross-linker being essentially 1:1 to ensure that all functional groups on both the polymeric resin and cross-linker are consumed during the urethane forming cross-linking reaction. For the purposes of this invention, the term polyisocyanate refers to isocyanate-functional compounds having at least two isocyanate functional groups, such as diisocyanate, isocyanurate, biuret, isocyanurate allophanates. In a preferred embodiment, the polymeric resin is the polyester-polyurethane resin.

The polyisocyanate of the present invention may be selected from compounds such as isophorone diisocyanate (IPDI), 4,4'-dicyclohexylmethane-diisocyanate, and trimethyl-hexamethylene-diisocyanate, 1,6-hexamethylene diisocyanate, 2,2,4-trimethylhexamethylene diisocyanate, octadecylene diisocyanate and 1,4 cyclohexylene diisocyanate. toluene diisocyanate; methylenediphenyl diisocyanate; tetra methylxylene diisocyanate, and isocyanurates, biurets, allophanates thereof, as well as mixtures thereof, as well as adducts, isocyanurates, biurets, and allophanates thereof. In one embodiment, the polyisocyanate comprises IPDI.

According to some embodiments of the present invention, each of the free isocyanate groups present on the cross-linker may be temporarily blocked with a blocking agent to ensure no premature reacting of the hydroxyl-groups and isocyanate groups occur before final curing—thereby extending the shelf-life of the precursor mixture during storage and shipment. Suitable blocking agents may include, for example, secondary or tertiary alcohols such as isopropanol or tert-butanol; C—H acidic compounds such as malonic dialkyl ester, acetylacetone, and acetoacetic alkyl ester, oximes such as formaldoxime, acetaldoxime, methyl ethyl ketone oxime, cyclohexanone oxime, acetophenone oxime, benzophenone oxime or diethylglyoxime, lactams such as ε-caprolactam, δ-valerolactam, γ-butyrolactam, phenols such as phenol, o-methylphenol; N-alkylamides such as N-methylacetamide, imides such as phthalimide, secondary amines such as diisopropylamine, imidazole, pyrazole, and 1,2,4-triazole. In a preferred embodiment, the cross-linker is ε-caprolactam blocked IPDI.

The blocking agent may be employed relative to the free isocyanate groups in a stoichiometric ratio of about 1:1 to ensure that all free isocyanate groups present on the cross-linker are temporarily blocked. The blocking agent prevents the isocyanate groups from prematurely reacting with moisture or cross-linker at room temperature, but will deblock from the isocyanate group at an elevated temperature of at no more than 170° C., thereby allowing the free isocyanate groups to react with the cross-linker and form a fully cured matrix.

In other embodiments, the blocked polyisocyanate may be in the form of a uretdione modified polyisocyanate. Uretdione modified polyisocyanates contain two free isocyanate groups as well as two internally blocked isocyanate groups. The internal blocking of the isocyanate groups occurs without the need of an external blocking agent, such as ε-caprolactam. At elevated temperatures, the uretdione ring is broken and the two internally blocked isocyanate groups are made available to react with isocyanate-reactive groups, such as hydroxyl groups, in a urethane forming reaction. According to the present invention, the uretdione blocked polyisocyanate may be formed from the above mentioned polyisocyanate compounds—such as IPDI. After deblocking, uretdione based on diisocyanates will contain an equivalent of four isocyanate groups.

In some embodiments, a catalyst may be added to aid the urethane-forming reaction between the hydroxyl groups and the isocyanate groups. The catalyst may be selected from organometallic catalysts, such as dibutyltin dilaurate or tin octoate, or tertiary amines, such as triethylamine, pyridine, N,N-dimethylaminocyclohexane, or 1,4-diazabicyclo[2.2.2]octane. Other catalysts may be selected from metal ion diacryliodium salts. The catalyst may be present in an amount ranging from about 0.001 wt. % to about 1 wt. % based on the total weight of the precursor mixture. This range includes all specific values and subranges there between, such as 0.002, 0.005, 0.01, 0.02, 0.05, 0.1, 0.2, 0.5, and 0.8 wt. % based on the total weight of the precursor mixture.

In some embodiments, the polymeric resin may be an isocyanate terminated urethane-polyester prepolymer. The prepolymer may be the reaction product of stoichiometric excess of polyisocyanate relative to hydroxyl-terminated polyester resin, the NCO:OH ratio ranging from 2:1 to 6:1. Excess isocyanate ensures that all free hydroxyl groups are consumed during the formation of the polyurethane prepolymer while ensuring that free isocyanate groups remain on the prepolymer. Any excess polyisocyanate remaining after the formation of the prepolymer may be stripped by low pressure vacuum. The free isocyanate groups present on the prepolymer may be blocked with previously discussed isocyanate blocking agents in a stoichiometric ratio of blocking agent to the free isocyanate of about 1:1 to ensure all free isocyanate groups present on the prepolymer are temporarily blocked. The blocked isocyanate-terminated polyester prepolymer may then be mixed with polyol cross-linker to form a storage stable precursor mixture. The polyol cross-linker comprises the same low molecular weight polyol compounds listed with respect to the formation of the polyester resin.

In some embodiments, carboxyl functional polyester resin may be cured with polyol cross-linker, thereby resulting in a polyester matrix. The free carboxyl groups present on the carboxyl-functional polyester resin may be present relative to the hydroxyl groups present on the cross-linker in a COOH:OH stoichiometric ratio of about 1:1, thereby ensuring that all functional groups present on both the polyester resin and the cross-linker are consumed during the esterification cross-linking reaction. The polyol cross-linker comprises the same low molecular weight polyol compounds listed with respect to the formation of the polyester resin.

The carboxyl functional polyester resin may also be cured with epoxy functional compounds. In some non-limiting embodiments, the epoxy functional compounds may include epoxy resin that may be saturated or unsaturated, aliphatic, cycloaliphatic, aromatic or heterocyclic.

Examples of epoxy resins suitable for use in the invention include polyglycidyl ethers of polyhydric compounds, brominated epoxies, epoxy novolacs or similar polyhydroxyphenol resins, polyglycidyl ethers of glycols or polyglycols, and polyglycidyl esters of polycarboxylic acids. Preferably the epoxy resin is a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A; 2,2-bis(4-hydroxy-tert-butylphenyl) propane; 1,1-bis(4-hydroxyphenyl) ethane; 1,1-bis(4-hydroxyphenyl) isobutane; 2,2-bis(4-hydroxytertiarybutylphenyl) propane; bis(2-hydroxynapthyl) methane; 1,5-dihydroxynaphthalene; 1,1-bis(4-hydroxy-3-alkylphenyl) ethane and the like.

According to the present invention, the binder composition is substantially free of a volatile solvent, excluding moisture content. For the purposes of this invention, the term "substantially free" means less than 0.05 wt. % based on the total weight of the referenced element. In a non-limiting example, a mixture comprising binder, cross-linker, and filler that is substantially free of solvent comprises solvent in an amount less than 0.05 wt. % based on the total weight of the mixture—preferably less than 0.01 wt. %. According to a preferred embodiment, the binder composition of the present invention has 100% solids is free of solvent—include volatile organic solvents. Furthermore, according to additional embodiments of the present invention, the binder composition is substantially free of polymer resin comprising fluoro-carbon groups, such as fluoro-modified polyurethane and fluorpolymer, e.g., PVDF, or PTFE. Stated otherwise, the polymeric resin, which makes up the binder composition of the present invention, is substantially free of fluoro-carbon groups.

According to some embodiments, the powder coating of the present invention may further comprise additives, fillers, coating performance enhancers. Such fillers and additives may include, but are not limited to, inert fillers, antioxidants, stabilizers, pigments, reinforcing agents, reinforcing polymer, lubricants, fungicides, degassers, a surfactant, flow additives, dispersants, thixotropic agents, adhesion promoters, light stabilizers, flame retardants, anticorrosion agents, inhibitors, leveling agents, anti-cratering agents, and mixtures thereof. In some embodiments, the fungicide may be present in an amount ranging from about 6 wt. % to about 10 wt. % based on the total weight of the powder coating composition. In a non-limiting example, the fungicide may comprise zinc borate, 2-(-4-thiazolyl)benzimidazole.

In some embodiments, the precursor composition may further comprise reinforcing polymer, such as acrylic copolymers that further comprise functional groups capable of reacting with the functional groups present in the binder. In a non-limiting example, the reinforcing polymer may comprise glycidyl-functional acrylic polymer. As previously discussed, glycidyl groups are capable of reacting with carboxylic acid groups.

Yet further additives include metals and metal oxides such as, for instance, chromium oxide, chromium, zinc oxide, copper oxide, copper, nickel, titanium, stainless steel, aluminum, titanium dioxide, tin oxide, iron, iron oxide, and the like. Such metals may serve, for instance, as abrasion-resistant fillers, compatibilizers, or as pigments. Pigments may further include compounds such as titanium dioxide, barium sulfate, calcium carbonate, or a combination thereof. In some embodiments of the present invention, the pigments may have an average particle size ranging from 180 nm to 220 nm; in a preferred embodiment, the pigment has an average particle size of about 200 nm. In some embodiments, the powder coating according to the present invention may comprise about 15 wt. % to about 30 wt. % of pigment. According to some embodiments, the powder coating according to the present invention may comprise about 20 wt. % of titanium dioxide.

The surfactant according to the present invention may be added to the precursor mixture in a surfactant composition prior to final processing and curing, as discussed herein. The surfactant composition according to the present invention is substantially free of solvent—preferably having a solids content of 100% and substantially free of solvent, including volatile organic solvents. The surfactant composition according to the present invention is in powder form at room temperature. The surfactant composition comprises at least one fluorosurfactant.

The fluorosurfactant according to the present invention may have a melting temperature that ranges from about 50° C. to about 70° C. In some embodiments, the fluorosurfactant of the present invention has a low pH value—ranging from about 1 to about 6, including all value and sub-ranges therebetween. In some embodiments, the fluorosurfactant may be an anionic fluorosurfactant. The anionic moiety of the fluorosurfactant according to the present invention is selected from a sulfate, sulfonate, phosphate, or carboxylate moiety, wherein preferred is a phosphate moiety. According to some embodiments, the fluorosurfactant of the present invention may have at least one of the following formulas:

$(R_fAO)P(O)(O^-M^+)_2$     Formula I

$(R_fAO)_2P(O)(O^-M^+)$     Formula II wherein $R_f$ is a $C_1$ to $C_{16}$ linear or branched perfluoroalkyl, which may be optionally interrupted by one, two or three ether oxygen atoms.

A is selected from: $(CH_2CF_2)_m(CH_2)_n$; $(CH_2)_oSO_2N(CH_3)(CH_2)_p$; $O(CF_2)_q(CH_2)_r$; or $OCHFCF_2OE$;

m is 0 to 4;

n, o, p, and r, are each independently 2 to 20;

q is 2;

E is a $C_2$ to $C_{20}$ linear or branched alkyl group optionally interrupted by oxygen, sulfur, or nitrogen atoms; a cyclic alkyl group, or a $C_6$ to $C_{10}$ aryl group;

M is a Group I metal or an ammonium cation $(NHx(R_2 y)^+$, wherein R2 is a $C_1$ to $C_4$ alkyl; x is 1 to 4; y is 0 to 3; and x+y is 4.

In a preferred embodiment, the fluorosurfactant may consist of the anionic fluorosurfactant of formula III:

$(R_fCH_2CH_2O)P(O)(ONH_4)_2$     Formula III wherein $R_f$ is a $C_4$ to $C_8$ perfluoroalkyl group having the formula: $F[CF_2\text{—}CF_2]_{3-8}$. In preferred embodiments, the fluorosurfactant is a solvent-free anionic fluorosurfactant. Suitable anionic fluorosurfactants are commercially available.

In some embodiments, surfactant composition according to the present invention is at least substantially free or free of cationic fluorosurfactants. According to some embodiments, the fluorosurfactant may be present in an amount ranging from about 0.05 wt. % to about 4 wt. % based on the total weight of the powder coating. In a preferred embodiment, the fluorosurfactant may be present in an amount ranging from about 0.7 wt. % to 3 wt. % based on the total weight of the powder coating. In some embodiments, the fluorosurfactant may be present in an amount ranging from about 1.5 wt. % to 3 wt. %, alternatively from about 0.1 wt. % to 0.3 wt. % based on the total weight of the powder coating. According to some embodiments, the fluorosurfactant may be present in an amount ranging from 10 wt. % to 25 wt. % based on the total weight of a pigment—including all sub-ranges and integers there between.

According to some embodiments of the present invention, the pigment, e.g., titanium dioxide, may be pretreated with the surfactant composition prior to be added to the precursor mixture. In a preferred embodiment, the pigment is pretreated with anionic fluorosurfactant according to the following steps: heating the anionic fluorosurfactant composition of the present invention to an elevated temperature to melt the anionic fluorosurfactant, which may range from 50° C. to 70° C. (including all integers and sub-ranges therebetween), followed by the addition of the titanium oxide. The anionic fluorosurfactant and the pigment are then mixed, thereby creating the pretreated titanium dioxide pigment. In some embodiments, the elevated temperature may be 55° C. The pretreated pigment can be cooled to room temperature and later mixed with the binder and cross-linker to form the precursor mixture, as discussed herein. In a preferred embodiment, the pigment is titanium dioxide that is pretreated with the anionic fluorosurfactant of formula III. It has been found that pretreating the pigment with the fluorosurfactant before the other ingredients of the coating compositions are added to produce the coating composition mixture ensures uniform dispersion of the fluorosurfactant in the coating composition.

According to some embodiments of the present invention, the binder, cross-linker, and additives and fillers may be combined into a single precursor mixture. The precursor mixture may be lightly mixed at room temperature by a dry blender for a period of time, thereby creating an evenly distribution of binder, cross-linker, and additives/fillers in the precursor mixture. After dry blending, the precursor mixture may be melt-mixed and pelletized according to the discussion herein.

According to some embodiments of the present invention, the precursor mixture may be processed in a melt extruder. The melt extruder may be a single screw or twin screw extruder. The melt extruder may comprise three zones: (1) a feed zone; (2) a melt zone; and (3) dispersion zone. The feed zone may be held at a temperature that is less than or equal to room temperature to prevent blockages of the precursor mixture. The melt zone is generally heated above the maximum Tg of the precursor mixture but below the de-blocking and reaction temperature of the precursor mixture. Operating between above the Tg and below the de-blocking/reaction temperature allows the precursor mixture to become molten and flow without the precursor mixture prematurely deblocking and reacting inside of the extruder. In the dispersion zone, the temperature is maintained above the Tg and below the deblocking temperature, thereby allowing the precursor mixture to become a uniform. In some embodiments, the melt zone and dispersion zone are operated at a temperature ranging from about 90° C. to 150° C.—including all subranges and integers therebetween. In some embodiments, the melt zone and dispersion zone are operated at a temperature ranging from 100° C. to 110° C. The extruder will comprise a heating means and a cooling means to ensure that the various zones stay within the appropriate temperature ranges.

After passing through the dispersion zone, the melt-mixed precursor mixture passed through an extruder exit die. The exit die may be provided with a plurality of apertures in a number of different configurations. In some embodiments, the exit die may be replaced by other devices which allow for a pressure drop across them; for example, such a pressure drop could be achieved using a particular screw configuration. In any event, the average residence time of the precursor mixture in the melt extruder will generally be less than 5 minutes and more typically in the range from 30 to 120 seconds. As the molten precursor mixture passes through the die, it is cooled, and pelletized. The pellets are ground and the resulting precursor powder is then collected. In some non-limiting embodiments, the precursor mixture may be ground by machine, such as a grinder, cryogenically grinder, or the like. The resulting precursor powder may have an average particle size of less than 100 μm, typically ranging from 30 to 50 μm.

According to some embodiments, a predetermined amount of the precursor powder may then be placed in a container, which is either placed into storage or shipped to another location for final processing, as discussed herein. In other embodiments, the precursor powder may finally processed at the same site as the melt-mixing. According to the present invention, final processing includes spray coating or electrostatic coating the precursor powder onto a substrate. The spray coating may applied by a spray gun in an electrostatic field or with a triboelectric gun in which the powder is charged by friction. The substrate according to the present invention may be a metallic substrate, ceramic substrate, composite substrate, or a combination thereof. In some embodiments, the metallic substrate may be an aluminum panel or a steel panel (including galvanized steel). According to some embodiments, the metallic substrate may be selected from materials such as iron, steel, aluminum, tin, and alloys thereof. The substrate may comprise any suitable dimensions suitable for ceiling panel applications.

After the precursor powder is spray coated onto the substrate, the resulting spray coating is cured by heating in an oven at a curing temperature that is above the deblocking and reaction temperature of the precursor mixture. In some embodiments, the curing temperature ranges from about 160° C. to 210° C. Curing may occur for a period of time sufficient for the binder and cross-linker to fully react, thereby forming the fully cured powder coating. In some embodiments, the curing occurs for a period of time ranging from 15 to 30 minutes for temperature ranging from about 160° C. to 190° C. In some embodiments, the curing may occur for a period of time ranging from about 6 to 15 minutes for temperatures ranging from about 190° C. to 210° C. The resulting cured powder coating and substrate form the dirt and/or soil repellent panel of the present invention. In some embodiments, the resulting powder coating has a thickness ranging from 40 um to 120 um including all sub-ranges and integers included there between.

According to some embodiments the powder coating of the present invention may be radiation curable by comprising the aforementioned acrylate-functional polymers. The present invention is illustrated with thermoset powder coating compositions. However, thermoplastic powder coating compositions can also be used.

The following examples are prepared in accordance with the present invention. The present invention is not limited to the examples described herein.

EXAMPLES

The examples according to the present invention are based on polyester powder coatings and polyurethane powder coatings. Each powder coating is the reaction product of a number of binders and cross-linkers. The specific reactants used in the examples are listed as follows:

i. Binder 1: Carboxylated polyester resin having 100% solids content (in granule form at room temperature); melt viscosity of about 5,000 mPa/s at 200° C. (4,400 to 5,700 mPa/s at 200° C.); Tg of about 70° C. (67° C.); acid value of about 33—commercially available as Crylcoat 2441-2;

ii. Binder 2: glycidyl-functional acrylic copolymer having 100% solids content (flaked powder at room temperature); softening point of 120° C. to 135° C.—commercially available as Isocryl EP-540;

iii. Binder 3: hydroxyl-terminated polyester resin having 100% solids content; melt viscosity ranging from 2,100 to 3,000 mPa/s at 200° C.; Tg of about 50° C. (48° C.-53° C.); OH value of about 290; acid value of about 11—commercially available as Polymac 3110;

iv. Binder 4: hydroxyl-terminated polyester resin having 100% solids content, melt viscosity of 4,000 mPa/s at 200° C.; Tg of about 60° C. (59° C.); OH value of 40; acid value of 13—commercially available as Rucote 102;

v. Cross-linker 1: ß-hydroxyalkylamides (HAA) having a solids content of 100 wt. %; melting point of 120° C. to 124° C.; OH value of 620 to 700—commercially available as Primid XL-552; and vi. Cross-linker 2: ε-caprolactam blocked IPDI having 100% solids content; Tg of about 60° C. (58° C.); NCO eq. weight of 280—commercially available as Alcure 4402.

According to the present invention, the polyester (PE) and polyurethane (PU) formulations are shown in Table 1 as follows:

TABLE 1

|  | PE Formulation 1 | PU Formulation 1 |
|---|---|---|
| Binder 1 | 80.5 wt. % | — |
| Binder 2 | 17 wt. % | — |
| Binder 3 | — | 28.8 wt. % |
| Binder 4 | — | 20.5 wt. % |
| Binder 5 | — | — |
| Cross-linker 1 | 2.5 wt. % | — |
| Cross-linker 2 | — | 50.7 wt. % |
| Total | 100 wt. % | 100 wt. % |

PE Formulation 2 is a polyester resin mixed with an epoxy functional cross-linker that contains of conventional titanium dioxide particles—commercially as Interpon D1036 from AkzoNobel.

PE Formulation 3 is a polyester resin mixed with an epoxy functional cross-linker that contains of conventional titanium dioxide particles—commercially available from AkzoNobel as Interpon EC544.

The examples of the present invention compare pigments that have been pre-treated with surfactant as well as not pretreated with surfactant—wherein the pretreated pigments include surfactant an anionic fluorosurfactant as well as relevant comparisons to other surfactants. The specific pre-treated pigments are as follows:

i. Surfactant Composition 1 has 100% solids and comprises the anionic fluorosurfactant ammonium C6-C16 perfluoroalkylethyl phosphate, which is available from Sensient under the tradename Unipure™ LC981, as a cosmetic ingredient.

ii. Surfactant Composition 2 has 100% solids and includes an anionic fluorosurfactant having a phosphate group The anionic fluorosurfactant has a melting temperature between 50° C. and 70° C. and a pH value between 1 and 5. An exemplary suitable anionic fluorosurfactant is commercially available from Du Pont, under the tradename Capstone® FS-66.

iii. Surfactant Composition 3 comprises a non-ionic fluorosurfactant. The surfactant composition 2 having a 100% solids content and a pH ranging from 7-8.5. An exemplary non-ionic surfactant is commercially available Capstone® FS-3100.

iv. Surfactant Composition 4 has 100% solids and comprises a monomeric fluorosurfactant having the formula of: $C_4F_9$—$CH$=$CH_2$. The monomeric fluorosurfactant has a boiling point of 58° C. and a viscosity of 7 mPa/s at 25° C. An exmplary monomeric fluorosurfactant is commercially available Capstone® 42-U.

v. Surfactant Composition 5 has 100% solids content and comprises a nonionic siloxane-based surfactant. The siloxane containing surfactant is commercially available Dynol® 960 from Air Products.

The surfactants, other than the fluorosurfactant of Surfactant Composition 1, are then used to pretreat titanium oxide powder according to the following methodology. Each of the surfactant composition is separately heated to 55° C. and subsequently mixed with an amount of titanium dioxide particles for a period of time. After the period of time, the pretreated titanium dioxide particles are cooled to room temperature and mixed with the various PU or PE formulation, as shown below in Table 2, thereby creating the precursor mixtures. The mixing of PU or PE formulation with the pretreated titanium is additional step is not required, however; it enhances the uniformity of the resultant system.

Each precursor mixture is then melt-mixed by extruder at a temperature ranging between 95° C. and 108° C. Each resulting extrudate is pelletized into powder. Each resulting powder is spray coated onto a first major surface of an aluminum substrate. The coated substrate is then heat cured at a temperature of 195° C., thereby producing the dirt repellant panel.

Each dirt repellant panel is then compared for dirt repellency according to the follow methodology. A dirt composition is prepared having components displayed in Table 2:

TABLE 2

| Component | Wt. % |
| --- | --- |
| Peat Moss | 35 |
| Portland Cement | 15 |
| Calcined Kaolin | 15 |
| Sno-Brite Clay | 15 |
| NaCl | 5 |
| Gelatin | 3.6 |
| Carbon Black | 1.5 |
| Red Iron Oxide | 0.3 |
| Stearic Acid | 2.2 |
| Oleic Acid | 2.2 |
| Palm Oil | 3.8 |
| Lanolin | 1.4 |

Sno-Brite Clay includes >95 wt. % Kaolin as well as minor amounts of silica (quartz, cristobalite), mica, and titanium dioxide. Each dirt repellent panel is positioned such that the powder coated surface faces upward. An amount (0.2 grams) of the dirt composition of Table 2 is then placed into a plastic cup and held over the powder coated surface, where the plastic cup is tapped allowing the dirt composition to fall naturally onto the upward facing powder coated surface of the dirt repellant panel. Except for the dirt composition that is applied to the powder coated surface, the dirt repellant panel remains untouched. The soiled dirt repellant panel is then left for a period of 24 hours.

After the period of 24 hours, the dirt repellant panel is flipped upside down (180°) causing the powder coated surface to face downward, allowing the loose dirt composition to fall off of the powder coated surface of the dirt repellant panel. The surface of the dirt repellant pane that is opposite the powder coated surface is then tapped 20 times causing additional dirt composition to fall off of the dirt repellant panel. The dirt repellant panel is then turned half way back (90°) such that the powder coated surface of the dirt repellant panel is facing sideways, followed by tapping the side of the dirt repellent panel 10 times. The dirt repellent panel is then turned back to the original position such that the powder coated surface is facing upwards, where the powder coated surface is then measured for a change in color value—i.e. "Delta E" (ΔE).

Delta E value is measured by the following calculation:

$$\Delta E = [(L_2-L_1)^2 + (a_2-a_1)^2 + (b_2-b_1)^2]^{1/2}$$

wherein $L_1$, $a_1$, and $b_1$ are each initial color values of an unsoiled dirt repellant panel that are measured using a Minolta Chroma Meter CR 410 from Minolta Corporation. The $L_2$, $a_2$, and $b_2$ values are the color values as measured by the Minolta Chroma Meter CR 410 after each sample is soiled by the dirt composition, as previously discussed. The various color readings are taken at three different areas on the sample, and the average Delta E is recorded—as shown in Table 3. The control sample for each test item is of the same color and construction as the test item.

TABLE 3

| | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| PE Formulation 1 | 64.6 | — | 64.6 | 65 | — | — | — | — | — |
| PE Formulation 2 | — | — | — | — | — | — | — | — | 65 |
| PE Formulation 3 | — | — | — | — | — | — | — | — | — |
| PU Formulation 1 | — | 33.7 | — | — | 33.7 | 33.7 | 33.9 | 32.8 | — |
| Surfactant Comp. 1 | — | — | 1 | 0.5 | 1 | 0.75 | 0.5 | 3 | — |
| Surfactant Comp. 2 | 1 | 1 | — | — | — | — | — | — | — |
| Surfactant Comp. 3 | — | — | — | — | — | — | — | — | 0.5 |
| Titanium Dioxide (g) | 20 | 20 | 20 | 20 | 20 | 20 | 20 | 20 | 20 |
| Additional Component* | 14.4 | 8.1 | 14.4 | 14.5 | 45.3 | 45.55 | 45.6 | 44.2 | 14.5 |
| Total | 100 | 100 | 100 | 100 | 100 | 100 | 100 | 100 | 100 |
| ΔE | 1.70 | 2.4 | 5.04 | 15.92 | 0.81 | 0.33 | 1.68 | 1.11 | 22.73 |

TABLE 3-continued

|  | Ex. 10 | Ex. 11 | Ex. 12 | Ex. 13 | Ex. 14 | Ex. 15 | Ex. 16 | Ex. 17 |
|---|---|---|---|---|---|---|---|---|
| PE Formulation 1 | 64.6 | 65 | — | 64.6 | 65 | — | — | — |
| PE Formulation 2 | — | — | — | — | — | — | 100 | — |
| PE Formulation 3 | — | — | — | — | — | — | — | 100 |
| PU Formulation 1 | — | — | 37.7 | — | — | 33.7 | — | — |
| Surfactant Comp. 1 | — | — | — | — | — | — | — | — |
| Surfactant Comp. 3 | — | — | — | — | — | — | — | — |
| Surfactant Comp. 4 | 1 | 0.5 | 1 | — | — | — | — | — |
| Surfactant Comp. 5 | — | — | — | 1 | 0.5 | 1 | — | — |
| Titanium Dioxide (g) | 20 | 20 | 20 | 20 | 20 | 20 | — | — |
| Additional Component* | 14.4 | 14.5 | 45.3 | 14.5 | 8.1 | 45.3 | — | — |
| Total | 100 | 100 | 100 | 100 | 100 | 100 | 100 | 100 |
| ΔE | 28.15 | 22.74 | 34.98 | 21.47 | 29.33 | 37.74 | 27.68 | 24.00 |

*Additional component: flow and leveling agents, non-pretreated pigments, and fungicides. For the polyurethane formulations, additional components include an effective amount of dibutyl tin dilaurate (about 0.5 wt. % based on entire weight of powder coating).

As shown in Table 3, the powder coatings based on the anionic fluorosurfactants (Examples 1-8) performed greater than the non-ionic surfactant (Example 9), monomeric surfactants (Examples 10-12), and siloxane containing surfactants (Examples 13-15). Examples 16 and 17 are control examples that are powder coatings containing titanium dioxide that has not been pretreated with a surfactant. Furthermore, as demonstrated by Examples 5-8 there is a marked improvement in performance properties when using polyurethane based powder coating as compared to the polyester based powder coating of Examples 3 and 4. Further, Examples 5 and 6 show a higher Delta E with less anionic fluorosurfactant in a polyurethane system compared to the Delta E of Example 8.

As those skilled in the art will appreciate, numerous changes and modifications may be made to the embodiments described herein, without departing from the spirit of the invention. It is intended that all such variations fall within the scope of the invention.

The invention claimed is:

1. A method of forming a dirt repellant panel comprising:
   a) applying a powder coating precursor to a substrate, the powder coating precursor comprising a mixture of polymeric resin, cross-linker, and anionic fluorosurfactant;
   b) heating the powder coating precursor to a curing temperature such that the polymeric resin and cross-linker chemically react to form a cured powder coating atop the substrate; and
   wherein the polymer resin is substantially free of fluorocarbon groups.

2. The method according to claim 1, wherein the curing temperature of step b) ranges from about 190° C. to about 210° C.

3. The method according to claim 1, wherein the powder coating precursor has a solids content of 100%.

4. The method according to claim 1, wherein the anionic fluorosurfactant is present in an amount ranging from 0.05 wt. % to 4 wt. % based on the total weight of the powder coating.

5. The method according to claim 1, wherein the cured powder coating is substantially free of fluoropolymer.

6. The method according to claim 1, wherein the anionic fluorosurfactant comprises a phosphate group substituent.

7. The method according to claim 1, wherein the anionic fluorosurfactant has a melting point ranging from 50° C. to 70° C.

8. The method according to claim 1, wherein the polymer resin has a glass transition temperature ranging from 45° C. to 90° C.

9. The method according to claim 1, wherein the powder coating precursor further comprises a pigment in an amount ranging from 10 wt. % to 30 wt. % based on the total weight of the powder coating precursor.

10. A method of forming a dirt repellant panel comprising:
    a) applying a powder coating precursor to a substrate, the powder coating precursor comprising a mixture of polymeric resin, cross-linker, a pigment, and anionic fluorosurfactant;
    b) heating the powder coating precursor to a curing temperature such that the polymeric resin and cross-linker chemically react to form a cured powder coating atop the substrate; and
    wherein the polymer resin is substantially free of fluorocarbon groups.

11. The method according to claim 10, wherein the anionic fluorosurfactant is present in an amount ranging from 0.05 wt. % to 4 wt. % based on the total weight of the powder coating.

12. The method according to claim 10, wherein the anionic fluorosurfactant comprises a phosphate group substituent.

13. The method according to claim 10, wherein the anionic fluorosurfactant comprises a C1 to C16 perfluoroalkyl group.

14. The method according to claim 10, wherein the anionic fluorosurfactant has a pH ranging from 1 to 6.

15. The method according to claim 10, wherein the cured powder coating has a thickness ranging from 40 μm to 120 μm.

16. The method according to claim 10, wherein the polymer resin comprises at least one of polyester resin, polyurethane resin, epoxy resin, or polyester-urethane acrylate resin.

17. The method according to claim 10, wherein the cross-linker comprises at least one of a hydroxyl group, a carboxylic acid group, an isocyanate group, or an epoxy group.

18. A method of forming a dirt repellant panel comprising:
    a) applying a powder coating precursor to a substrate, the powder coating precursor comprising a mixture of polymeric resin, cross-linker, and anionic fluorosurfactant;
    b) heating the powder coating precursor to a curing temperature such that the polymeric resin and cross-linker chemically react to form a cured powder coating atop the substrate; and wherein the anionic fluorosurfactant comprises a phosphate group substituent.

19. The method according to claim 18, wherein the polymer resin is substantially free of fluoro-carbon groups.

20. The method according to claim 18, wherein the anionic fluorosurfactant is present in an amount ranging from 0.05 wt. % to 4 wt. % based on the total weight of the powder coating.

* * * * *